(12) United States Patent
Mertes

(10) Patent No.: US 11,572,185 B2
(45) Date of Patent: Feb. 7, 2023

(54) ENGINE ATTACHMENT FOR AN ENGINE OF AN AIRCRAFT COMPRISING A YOKE, A CONNECTING ROD AND A WEARING PART BETWEEN THE YOKE AND THE CONNECTING ROD

(71) Applicant: Airbus Operations SAS, Toulouse (FR)

(72) Inventor: Anthony Mertes, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 8 days.

(21) Appl. No.: 17/194,586

(22) Filed: Mar. 8, 2021

(65) Prior Publication Data

US 2021/0284349 A1    Sep. 16, 2021

(30) Foreign Application Priority Data

Mar. 10, 2020 (FR) ..................... 2002345

(51) Int. Cl.
*B64D 27/26* (2006.01)
*B64D 27/18* (2006.01)

(52) U.S. Cl.
CPC ............ *B64D 27/26* (2013.01); *B64D 27/18* (2013.01); *B64D 2027/262* (2013.01)

(58) Field of Classification Search
CPC ... B64D 27/26; B64D 2027/262; B64D 27/18
See application file for complete search history.

(56) References Cited

U.S. PATENT DOCUMENTS

| 4,943,013 A * | 7/1990 | Kapala | F16B 39/10 244/54 |
| 2014/0077027 A1* | 3/2014 | Durand | B64D 27/26 244/54 |

FOREIGN PATENT DOCUMENTS

| EP | 0357504 A1 | 3/1990 |
| FR | 2951511 A1 | 4/2011 |
| WO | 2012131233 A2 | 10/2012 |

OTHER PUBLICATIONS

French Search Report; priority document.

* cited by examiner

*Primary Examiner* — Christopher D Hutchens
*Assistant Examiner* — Steven J Shur
(74) *Attorney, Agent, or Firm* — Greer, Burns & Crain, Ltd.

(57) ABSTRACT

An aircraft engine attachment including a beam fixed to a pylon and including a yoke with two walls, and a connecting rod with an articulation housed in the yoke, in which the connecting rod has a front flank and a rear flank which are facing inner faces of the walls. For each wall, a wearing part is disposed against the inner face of the wall and between the wall and the corresponding flank of the connecting rod. A Fixing arrangement ensures the fixing of the wearing part to the wall. Thus, the wearing parts prevent an excessive tilting of the connecting rod and the wearing of the connecting rod or of the yoke.

10 Claims, 3 Drawing Sheets

ENGINE ATTACHMENT FOR AN ENGINE OF AN AIRCRAFT COMPRISING A YOKE, A CONNECTING ROD AND A WEARING PART BETWEEN THE YOKE AND THE CONNECTING ROD

CROSS-REFERENCES TO RELATED APPLICATIONS

This application claims the benefit of the French patent application No. 2002345 filed on Mar. 10, 2020, the entire disclosures of which are incorporated herein by way of reference.

FIELD OF THE INVENTION

The present invention relates to an engine attachment for an engine of an aircraft in which the engine attachment comprises a yoke, a connecting rod and a wearing part between the yoke and the connecting rod which forms a buffer in case of convergence of the connecting rod and the yoke, and an aircraft comprising an engine and such an engine attachment.

BACKGROUND OF THE INVENTION

An aircraft conventionally comprises an engine which is fixed under a wing. To this end, the aircraft comprises a pylon which is fixed under the wing and which bears the engine. The fixing between the engine and the pylon is made via engine attachments. An engine attachment conventionally comprises a beam which is fixed to the pylon by bolts and at least one connecting rod with two articulations, one of which is mounted articulated on the beam, and the other of which is mounted articulated on the engine. Conventionally, the engine attachment comprises a connecting rod with two articulations and a connecting rod with three articulations, of which two are mounted articulated on the beam and of which the other is mounted articulated on the engine.

At each end, the connecting rod with two articulations has a bore inside which there is positioned a cage with a spherical internal surface and each articulation takes the form of a shaft bearing a spherical nut on which the spherical internal surface of the cage is fitted.

Each articulation thus constitutes a ball joint and, in some conditions, it may be that the connecting rod with two articulations pivots about its articulations to enter into contact with the beam or the engine. Eventually, it may be that the beam, the engine or the connecting rod suffers damage which necessitates replacement.

There is therefore a need to find an arrangement which prevents the wearing of the connecting rod and/or of the beam and/or of the engine.

SUMMARY OF THE INVENTION

One object of the present invention is to propose an engine attachment for an engine of an aircraft in which the engine attachment comprises a yoke, a connecting rod and a wearing part which forms a buffer in case of convergence of the connecting rod and of the yoke or of the engine.

To this end, an engine attachment is proposed that is configured to be fixed between a pylon and an engine of an aircraft, the engine attachment comprising:

a beam configured to be fixed to the pylon and comprising a yoke having two walls in which each wall comprises an inner face oriented towards the inner face of the other wall, a connecting rod with two articulations with a first articulation disposed at a first end of the connecting rod and housed in the yoke to ensure the fixing of the connecting rod to the beam and with a second articulation disposed at a second end of the connecting rod and configured to ensure the fixing of the connecting rod to the engine, in which the connecting rod has a front flank and a rear flank opposite the front flank, in which each flank is facing one of the inner faces of one of the walls, for each wall, a wearing part disposed against the inner face of the wall and between the wall and the corresponding flank of the connecting rod, and fixing means which ensure the fixing of the wearing part to the wall in which the fixing means for fixing a wearing part comprise a paddle and two bolts which secure the paddle and the wearing part by sandwiching the wall between the paddle and the wearing part.

Thus, the wearing parts prevent an excessive tilting of the connecting rod and the wearing of the connecting rod or of the yoke.

According to a particular embodiment, the wearing part takes the form of a U, of which each arm extends outwards and has a bent portion which comes parallel facing the paddle, and the barrel of each bolt passes through one of the bent portions and the paddle.

According to another particular embodiment, the wearing part is flat, and the paddle takes the form of a U, of which each arm extends inwards and of which a face comes parallel facing the wearing part and the barrel of each bolt passes through one of the arms of the paddle and the wearing part.

Advantageously, the paddle has two flanges and each flange bears against a side of the corresponding wall.

The invention also proposes an aircraft comprising a pylon, an engine and an engine attachment according to one of the preceding variants, in which the beam is fixed to the pylon and in which the second articulation ensures the fixing of the connecting rod to the engine.

BRIEF DESCRIPTION OF THE DRAWINGS

The features of the invention mentioned above, and others, will become more clearly apparent on reading the following description of an exemplary embodiment, the description being given in relation to the attached drawings, in which.

DETAILED DESCRIPTION OF THE PREFERRED EMBODIMENTS

Figure 1:
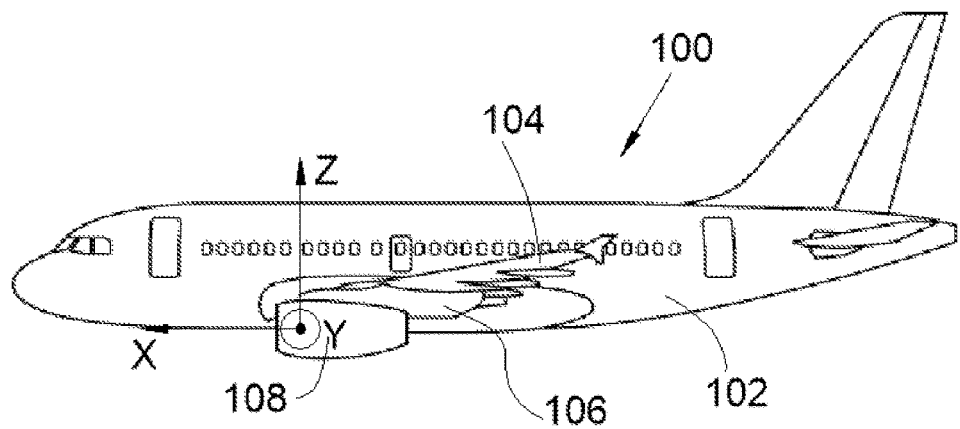
FIG. 1 is a side view of an aircraft comprising an engine attachment according to the invention.

FIG. 1 shows an aircraft 100 which has a fuselage 102 on either side of which there is fixed a wing 104. Under each wing 104, there is fixed at least one engine 108, such as, for example, a turbofan engine. The engine 108 is fixed to the wing 104 via a pylon 106 and the fixing between the engine 108 and the pylon 106 is made via engine attachments, in particular, a front engine attachment and a rear engine attachment.

In the following description, and by convention, X denotes the longitudinal direction of the jet engine, oriented positively in the direction of advance of the aircraft which is also the longitudinal direction of the nacelle, Y denotes the transverse direction which is horizontal when the aircraft is on the ground, and Z denotes the vertical direction or vertical height when the aircraft is on the ground, these three directions X, Y and Z being mutually orthogonal.

The front engine attachment is fixed between the pylon 106 and a front part of the engine 108 and the rear engine attachment is fixed between the pylon 106 and a rear part of the engine 108.

Figure 2:
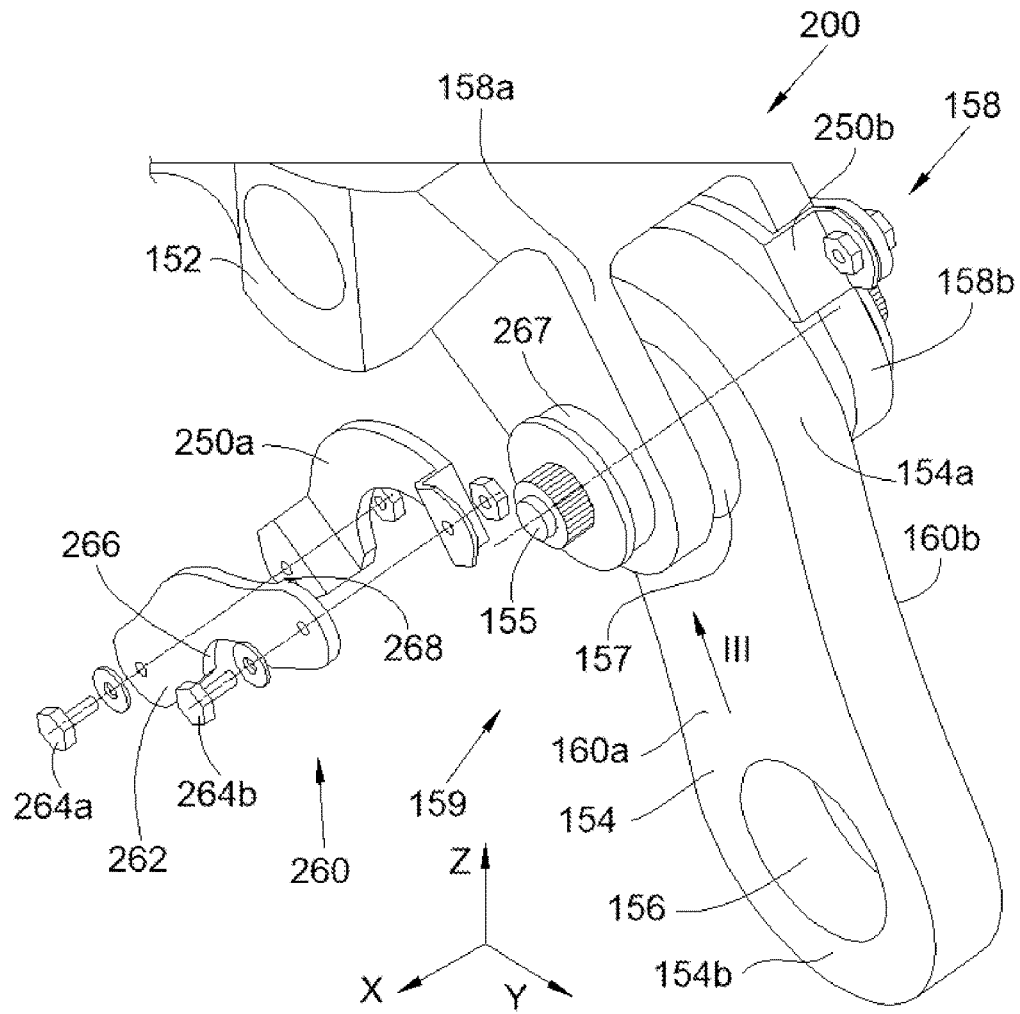
FIG. 2 is a perspective and partially exploded view of an engine attachment according to the invention.
Figure 3:
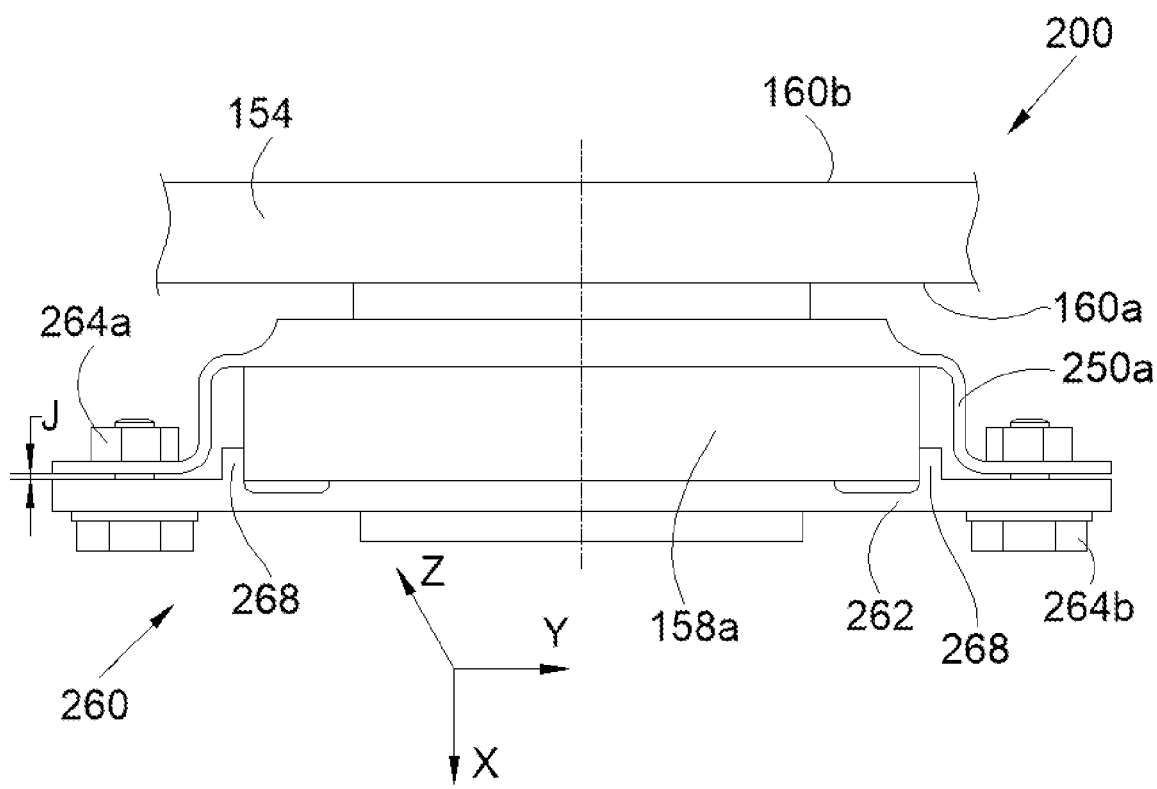
FIG. 3 is a view according to the arrow III of FIG. 2 of the engine attachment according to the invention.

FIGS. 2 and 3 show an engine attachment 200 according to a first embodiment of the invention. The invention applies equally to a front engine attachment or to a rear engine attachment.

The engine attachment 200 comprises a beam 152 which is fixed to the pylon 106, for example by bolts.

The engine attachment 200 also comprises at least one connecting rod 154 with two articulations which has a first articulation disposed at a first end 154a of the connecting rod 154 and a second articulation disposed at a second end 154b of the connecting rod 154.

Conventionally, at each end 154a-b, the connecting rod 154 has a bore 156, inside which there is positioned a cage, of which the internal surface is spherical and each articulation takes the form of a shaft 155 bearing a spherical nut 157 around which the spherical internal surface of the cage is positioned.

The first articulation ensures the fixing of the connecting rod 154 to the beam 152 and the second articulation ensures the fixing of the connecting rod 154 to the engine 108.

The first articulation is housed in a yoke 158 of the beam 152 and the second articulation is housed in a yoke of the engine 108. Each yoke 158 has two walls and all the walls are parallel and for each yoke 158, the connecting rod 154 is placed between the walls of the yoke 158 and the axes of the two yokes 158 are parallel to one another and, here, parallel to the longitudinal direction X. Each wall of each yoke 158 has a bore that is coaxial with the bore 156 of the corresponding end 154a-b of the connecting rod 154 and which allows the shaft 155 of the articulation to be put in place. The shaft 155 is fixed by fixing means 159 which are conventional to the person skilled in the art and are not described further.

Each yoke 158 has a front wall 158a disposed towards the front and a rear wall disposed to the rear with respect to the front wall 158a and each wall 158a-b has an inner face oriented towards the inner face of the other wall 158b-a and an outer face oriented in the opposite direction to the inner face.

The connecting rod 154 has a front flank 160a and a rear flank 160b opposite the front flank 160a and oriented towards the rear and each flank 160a-b comes facing a wall 158a-b of each yoke 158. More particularly, the front flank 160a is facing the inner face of the front wall 158a and the rear flank 160b is facing the inner face of the rear wall 158b.

To prevent a tilting force from bringing the connecting rod 154 into contact with one of the walls 158a-b of the yoke 158 of the beam 152 or of the engine 108, the engine attachment 200 comprises, for each wall 158a-b of the yoke 158 of the beam 152, a wearing part 250a-b which is fixed inside the yoke 158 against the wall 158a-b, more particularly, against the inner face of the wall 158a-b, and between the wall 158a-b and the corresponding flank 160a-b of the connecting rod 154. This wearing part 250a-b prevents friction between the connecting rod 154 and the yoke 158 of the beam 152 and will wear on contact with the connecting rod 154. Furthermore, by limiting the rotation of the connecting rod 154, the wearing part 250a-b will prevent the contact between the connecting rod 154 and the yoke of the engine 108.

Each wearing part 250a-b is fixed directly to the wall 158a-b of the yoke 158 by fixing means 260.

Figure 4:
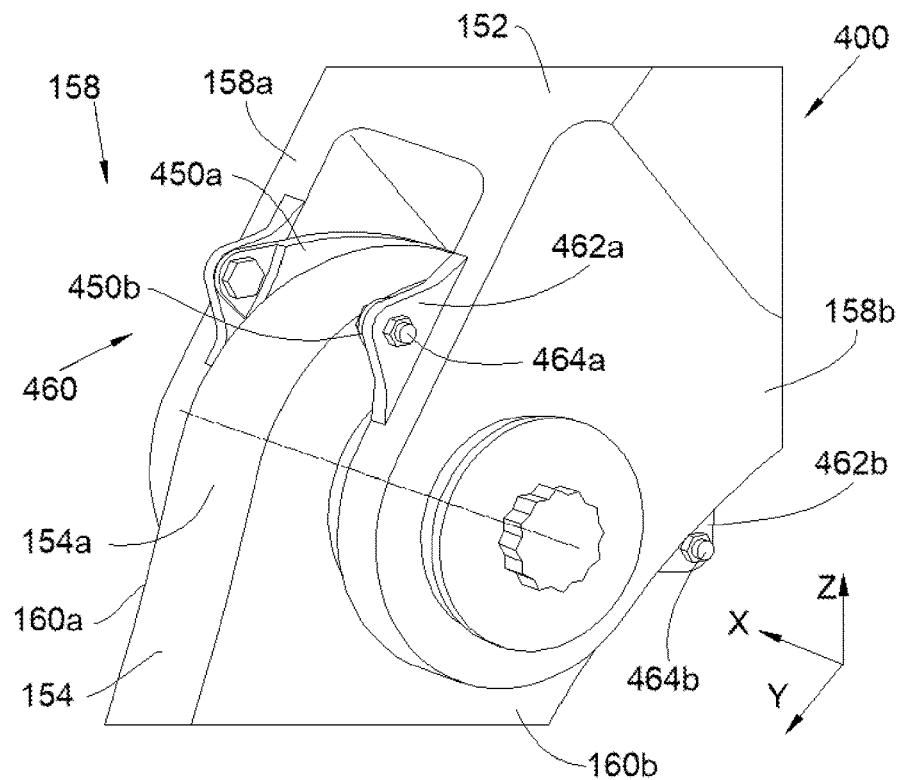
FIG. 4 is a perspective view of another engine attachment according to another embodiment of the invention.

FIG. 4 shows an engine attachment 400 according to a second embodiment of the invention. The elements which are identical to the first and second embodiments bear the same reference.

The difference between the first embodiment and the second embodiment lies in the fixing means 260, 460 for fixing each wearing part 250a-b, 450a-b to the associated wall 158a-b.

In the embodiment of the invention of FIG. 2 and of FIG. 3, the fixing means 260 for fixing a wearing part 250a-b comprise a paddle 262 and two bolts 264a-b. The paddle 262 bears against the outer face of the wall 158a-b and the wearing part 250a-b bears against the inner face of the wall 158a-b. The bolts 264a-b secure the paddle 262 and the wearing part 250a-b by sandwiching the wall 158a-b between the paddle 262 and the wearing part 250a-b.

The bolts 264a-b are disposed on either side of the wall 158a-b, that is to say, here, to port and starboard.

The wearing part 250a-b takes the form of a U, of which each arm extends outwards and has a bent portion which comes parallel facing the paddle 262. The barrel of each bolt 264a-b thus passes through one of the bent portions and the paddle 262.

To ensure a good positioning of the wearing part 250a-b, the paddle 262 has a notch 266 which is cylindrical and which comes to bear on top of a ring 267 of the fixing means 159.

To limit the rotation of the wearing part 250a-b about an axis parallel to the longitudinal direction X, the paddle 262 has two flanges 268 and each flange 268 comes to bear against a side of the corresponding wall 158a-b. One side of the wall 158a-b is the surface which links the flanks 160a-b.

Furthermore, to ensure a good clamping of the wall 158a-b by the wearing part 250a-b and the paddle 262, the dimensions of the wearing part 250a-b and the paddle 262 are calculated so that, when they are in place, there is a play T between the bent portion and the paddle 262 before the tightening of the bolts 264a-b.

In the embodiment of the invention of FIG. 4, the fixing means 460 for fixing a wearing part 450a-b comprise two bolts 464a-b which are fixed directly to the corresponding wall 158a-b and in which the barrel of each bolt 464a-b passes through the wearing part 450a-b and sandwiches it between the wall 158a-b and the head of the bolt 464a-b.

In the embodiment of the invention presented here, each wall 158a-b comprises two lugs 462, in each of which a bore is made for the passage of the bolt 464a-b.

The bolts 464a-b are disposed on either side of the wall 158a-b, that is to say, here, to port and to starboard.

Figure 5:
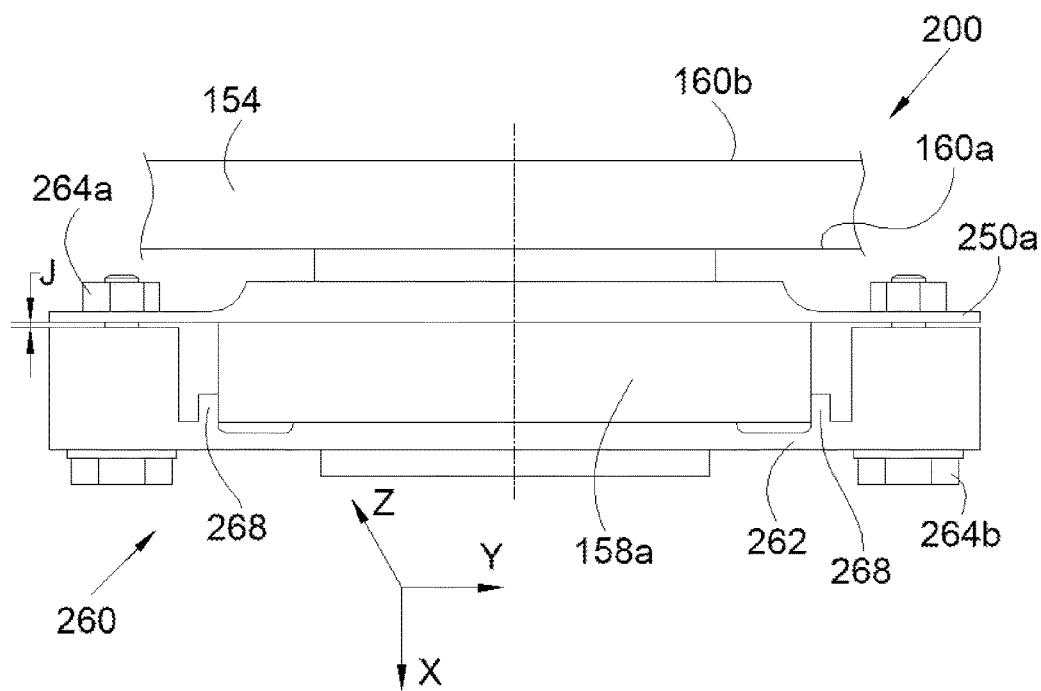
FIG. 5 is a view similar to FIG. 3 for a variant embodiment of the invention.

FIG. 5 shows a variant in which the paddle 262 takes the form of a U of which each arm extends inwards and of which a face comes parallel facing the wearing part 250a-b which is flat. The barrel of each bolt 264a-b thus passes through one of the arms of the paddle 262 and the wearing part 250a-b.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine attachment configured to be fixed between a pylon and an engine of an aircraft, said engine attachment comprising:
    a beam configured to be fixed to the pylon and comprising a yoke having two walls in which each wall comprises an inner face oriented towards the inner face of an other of the two walls,
    a connecting rod with two articulations with a first articulation disposed at a first end of the connecting rod and housed in the yoke to ensure a fixing of the connecting rod to the beam and with a second articulation disposed at a second end of the connecting rod and configured to ensure a fixing of the connecting rod to the engine, in which the connecting rod has a front flank and a rear flank opposite the front flank, in which each flank is facing one of the inner faces of one of the two walls,
    for each wall, a wearing part disposed against the inner face of said wall and between said wall and a corresponding flank of the connecting rod, and
    fixing means which ensure the fixing of the wearing part, to the wall, in which the fixing means for fixing a wearing part comprise a paddle and two bolts which secure the paddle and the wearing part by sandwiching the wall between the paddle and the wearing part.

2. The engine attachment according to claim 1, wherein the wearing part is formed as a U, in which each arm of the U extends outwards and has a bent portion which comes parallel facing the paddle, and wherein a barrel of each bolt passes through one of the bent portions and the paddle.

3. The engine attachment according to claim 1, wherein the wearing part is flat, wherein the paddle is formed as a U, in which each arm of the U extends inwards and of which one face comes parallel facing the wearing part and wherein a barrel of each bolt passes through one of the arms of the paddle and the wearing part.

4. The engine attachment according to claim 1, wherein the paddle has two flanges and wherein each flange bears against a side of a corresponding wall.

5. An aircraft comprising a pylon, an engine and an engine attachment according to claim 1, wherein the beam is fixed to the pylon and wherein the second articulation ensures a fixing of the connecting rod to the engine.

6. An engine attachment configured to be fixed between a pylon and an engine of an aircraft, said engine attachment comprising:
    a beam fixed to the pylon, the beam comprising a yoke having two walls in which each wall comprises an inner face oriented towards the inner face of an other of the two walls,
    a connecting rod having a first articulation disposed at a first end of the connecting rod between the two walls of the yoke to attach the connecting rod to the beam, the connection rod having a second articulation disposed at a second end of the connecting rod to attach the connecting rod to the engine, the connecting rod further having a front flank and a rear flank opposite the front flank, in which each flank is facing one of the inner faces of one of the two walls of the yoke of the beam,
    for each wall of the yoke, a wearing part disposed against the inner face of said wall of the yoke and between said wall of the yoke and a corresponding flank of the first end of the connecting rod, and
    fixing means attaching the wearing part, to the wall of the yoke of the beam, in which the fixing means comprises a paddle and two bolts which secure the paddle and the wearing part by sandwiching the wall of the yoke of the beam between the paddle and the wearing part.

7. The engine attachment according to claim 6, further comprising a shaft passing through each wall of the yoke of the beam and the first end of the connecting rod therebetween, wherein the wearing part is positioned above the shaft and terminates at flanges, wherein the shaft passes between the flanges.

8. The engine attachment according to claim 7, wherein the flanges are located on opposing lateral sides of each wall of the yoke adjacent outer faces of the each wall.

9. The engine attachment according to claim 6, further comprising a shaft passing through each wall of the yoke of the beam and the first end of the connecting rod therebetween, wherein the wearing part extends only partially about a circumference of the shaft.

10. The engine attachment according to claim 9, wherein the flanges are located on opposing lateral sides of each wall of the yoke adjacent outer faces of the each wall.

* * * * *